United States Patent [19]

Dickerson et al.

[11] Patent Number: 5,213,739
[45] Date of Patent: May 25, 1993

[54] PROCESS FOR BONDING ELASTOMERS TO METALS

[75] Inventors: George E. Dickerson, Yorktown; Henry L. Kelley, Newport News, both of Va.

[73] Assignee: The United States of America as represented by the Administrator of the National Aeronautics and Space Administration, Washington, D.C.

[21] Appl. No.: 721,038

[22] Filed: Jun. 26, 1991

[51] Int. Cl.$^5$ ............................................. B29C 45/16
[52] U.S. Cl. .................... 264/135; 156/245; 264/259; 264/265; 264/DIG. 65
[58] Field of Search ............... 264/134, 135, 259, 265, 264/DIG. 65; 427/327; 156/307.3, 307.5, 307.7, 900, 245, 281, 309.6

[56] References Cited

U.S. PATENT DOCUMENTS

| | | | |
|---|---|---|---|
| 2,188,434 | 1/1940 | Grinter | 264/135 |
| 2,234,621 | 3/1941 | Brous | 156/315 |
| 2,337,555 | 12/1943 | Hosking | 264/135 |
| 2,765,248 | 10/1956 | Beech et al. | 156/245 |
| 3,207,358 | 9/1965 | Fliss | 427/327 |
| 3,243,321 | 3/1966 | Rowand | 427/327 |
| 3,282,883 | 11/1966 | DeCrease et al. | 524/197 |
| 3,352,955 | 11/1967 | Pigott et al. | 264/135 |
| 3,481,812 | 12/1969 | Holub et al. | 156/307.7 |
| 3,514,312 | 5/1970 | Gardiner | 427/327 |
| 3,844,030 | 10/1974 | Wilkinson | 264/135 |
| 4,079,168 | 3/1978 | Schwemmer et al. | 156/333 |
| 4,719,065 | 1/1988 | Gibbon | 264/135 |
| 4,808,361 | 2/1989 | Castro et al. | 264/255 |

FOREIGN PATENT DOCUMENTS 61-116531  6/1986  Japan ................... 264/135

OTHER PUBLICATIONS

S. Buchan, "Rubber to Metal Bonding," Palmerton Publishing Co., Inc., New York, 1959, pp. 82-83, 112-113.

Maurice Morton, "Rubbert Technology," Van Nostrand Reinhold Company, New York, 1973, p. 34.

*Primary Examiner*—Jay H. Woo
*Assistant Examiner*—Robert B. Davis
*Attorney, Agent, or Firm*—George F. Helfrich

[57] ABSTRACT

A process for bonding elastomeric material to a metal part includes coating a heat curable adhesive on surfaces of the metal part to be bonded, placing the metal part in a mold, preheating a bottom plate and an upper transfer pot of a transfer molding machine to a predetermined cure temperature, loading a predetermined quantity of uncured elastomeric material into the transfer pot, clamping the mold containing the adhesive coated metal part to the bottom plate, and almost contemporaneously, pressing the uncured elastomeric material into the mold while maintaining heat and pressure in the mold for a time sufficient to vulcanize and thereby cure the elastomeric material simultaneously with the adhesive, whereby contacting surfaces of the metal part are strongly bonded to the vulcanized elastomeric material.

6 Claims, 1 Drawing Sheet

PROCESS FOR BONDING ELASTOMERS TO METALS

ORIGIN OF THE INVENTION

The invention described herein was made by employees of the U.S. Government and may be manufactured and used by or for the Government for governmental purposes without the payment of any royalties thereon or therefore.

BACKGROUND OF THE INVENTION

1. Field of the Invention

The present invention relates generally to processes for bonding elastomers to metals and, more specifically, to a process which employs curable adhesives.

2. Description of the Related Art

There are numerous mechanical structures, particularly in the areas of shock and vibration dampening, wherein it becomes necessary to either adhere an elastomer to a metal substrate, or to interconnect two metal structures with an elastomer joint in which the elastomer is bonded to the surfaces of the two metal structures.

One type of structure is illustrated in FIG. 1, whereby a first metal part 10 is connected to a second metal part 12 by an elastomer joint 14. The metal part 10 has an arm 16 which extends between the arms 18 and 20 of a clevis-type structure.

In the past, to interconnect metal parts to an elastomer, the elastomer could be pre-vulcanized (meaning that an elastomeric block 14 could be fabricated prior to attachment) and then a low-temperature adhesive cure cycle would be used to attach the elastomeric block to a metal structure. For example, in the illustration of FIG. 1, the arm 18 and the elastomeric block 14 (in a pre-vulcanized condition) could be adhered together by applying an adhesive on the opposing surfaces of each. After curing, the interconnected structure would consist of a metal arm 18, an elastomeric block 14, and an intermediate thin layer of cured adhesive (not shown).

It has also been known in the past to vulcanize the elastomer 14 to a preheated adhesive surface. In other words, the various metal parts 10 and 12 could be placed in a mold cavity after applying an adhesive to the surfaces of the metal parts which would be in contact with elastomeric material, and then vulcanization would occur whereby elastomeric material is injected in to the mold at high pressure and temperature.

Disadvantages of the prior art are evident in the not so infrequent separation (de-bonding) of the metal parts from the corresponding elastomeric material. This can be a particularly hazardous problem when the metal parts are used in the aircraft industry, such as in the area of a helicopter rotor. In the one instance, prevulcanized elastomeric material adhered by an adhesive to the metal parts has been found to cause premature de-bonding and thus it can be said that a weak bond is created at the interface between the metal and the elastomer. Also, pre-vulcanizing results in excessive time and labor due to the numerous process steps individually required to accomplish the bond. Moreover, when separate vulcanization and bonding cycles are used, additional thermal and physical stresses on the materials and interfaces are imposed, thus enhancing the likelihood of a part failure such as premature de-bond.

Other bonding techniques have been noted from various U.S. patents. A brief description follows:

U.S. Pat. No.2,234,621, issued to Brous, discloses a method of adhering polyvinyl chloride to metal by means of a layer of halogenated rubber between the two materials. The process uses a heated press, but does not describe a situation where an adhesive and an elastomer are co-cured.

U.S. Pat. No. 2,765,248, issued to Beech et al, discloses a combined metal and plastic article formed in a mold, with the plastic used as a backing for a thin metal shell. The plastic is formed in the metal shell while the metal shell is still hot so that the resin tends to fill the open pores of the metal to form a band between the plastic and the shell.

U.S. Pat. No. 3,207,358, issued to Fliss, discloses a water storage tank that includes an internal plastic liner. A steel tank body is cleaned, grit-blasted, and then preheated. A spray gun uniformly applies an epoxy resin to the tank body. The epoxy resin is fully cured and becomes strongly adherent on the inner surface of the steel tank body by heating both the tank and the resin.

U.S. Pat. No. 3,243,321, issued to Rowand discloses a method of coating metal surfaces with polytetrafluoroethylene (PTFE).

U.S. Pat. No. 3,481,812, issued to Holub et al, discloses a method of laminating metal substrates with a polymer of ethylene, particularly polyethylene. A peroxide is incorporated in the polyethylene so that it adheres to the metal surface during curing.

U.S. Pat. No. 3,514,312, issued to Gardiner, discloses a method of bonding plastisol material to a metal substrate. An adhesive coating on the metal substrate is heated before bonding.

U.S. Pat. No. 4,233,098, issued to Urbain, discloses a method of making metal-plastic skis which includes glueing coated metal sheets to a plastic material. The plastic and adhesive are not cured during the bonding process.

In none of the above patents are there any methods for molding an elastomer on a metal substrate with an adhesive, with simultaneous curing/vulcanization of the adhesive and elastomer. In summary, the previous methods of bonding elastomers to metal substrates include either using a low-temperature adhesive cure cycle while a previously vulcanized elastomer is bonded, or vulcanizing the elastomer occurs during the bonding process with a previously cured (pre-heated) adhesive surface. Both of these methods cause premature debonding of parts because of a weak bond interface between the metal and the elastomer. In the latter, the common practice is to place the mold containing the metal substrate in the press while the press plates are being heated so that the adhesive begins to cure prior to injection of the elastomeric material.

SUMMARY OF THE INVENTION

An object of the present invention is to provide a process for bonding elastomers to metal substrates in which failures due to de-bonding are prevented.

Another object of the present invention is to provide a process for bonding elastomers to metal parts whereby a strong bond is made between the elastomeric material and the metal.

Another object of the present invention is to provide a process for bonding elastomers to metal parts whereby residual stresses placed on the elastomeric material and the metal parts are kept at a minimum.

These and other objects of the invention are met by providing a process of bonding elastomeric material to a metal part, involving the steps of coating a heat curable adhesive on surfaces of the metal part to be bonded, placing the metal part in a mold, preheating a bottom plate and an upper transfer pot of a transfer molding machine to a cured temperature, loading a predetermined quantity of uncured elastomeric material into the transfer pot, clamping the mold containing the adhesive coated metal part to the bottom plate, pressing the uncured elastomeric material into the mold, and maintaining heat and pressure in the mold for a time sufficient to vulcanize and thereby cure the elastomeric material simultaneously with the adhesive, whereby contacting surfaces of the vulcanized elastomeric material and the metal part are strongly bonded.

These and other features and advantages of the bonding process of the present invention will become more apparent with reference to the following detailed description and drawings.

DETAILED DESCRIPTION OF THE PREFERRED EMBODIMENTS

Figure 1:
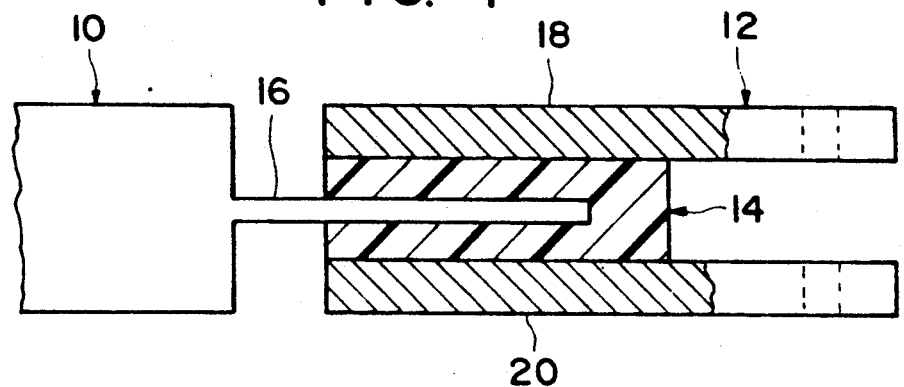
FIG. 1 is an enlarged end view, partly in section, showing a device including metal parts and elastomeric material bonded therebetween.

The present invention is a process which uses a heat curable adhesive and a heat curable elastomeric material. As will be explained below, the focus of the present invention is on the simultaneous curing/vulcanization of the adhesive and the elastomer.

To achieve the objects of the present invention, certain commercially available bonding agents are used, such as CHEMLOK 220/205 which is produced by Hughson Chemicals. The CHEMLOK adhesive is already in use for bonding natural and synthetic rubber to metal during vulcanization. While the exact chemical composition of CHEMLOK is kept as a trade secret by Hughson Chemicals, the adhesive is of the heat-curing-type. The adhesive is applied as a coating and can be brushed on, sprayed, etc. CHEMLOK has been used to bond the following elastomers to metals:

| Elastomer | Metal |
| --- | --- |
| Natural rubber | Carbon or alloy steel |
| Styrene-butadiene rubber (SBR) | Stainless steel |
| Neoprene | Copper or copper alloys |
| Butyl | Brass |
| Nitrile | Aluminum or aluminum alloys |
| olyisoprene | Magnesium |
| Polybutadiene | dye casting alloys, plated metals and many rigid plastics |

CHEMLOK is applied at room temperature and dries to an adhesive film which is non-tacky. Bonding time and temperatures range from 30 to 45 seconds at 450° F. (232° C.) in injection molding to many hours in tank lining applications. Mold cycles may vary from five minutes to more than an hour at 250° to 350° F. (121°–177° C.). CHEMLOK 220 consists essentially of dissolved organic polymers and dispersed fillers in a xylene and perchloroethylene solvent system. It has a viscosity of 135 to 300 cps at 77° F. (25° C.) and has a specific gravity of 1.00 to 1.10.

CHEMLOK 205 also consists of dissolved organic polymers and dispersed fillers, but these are in a methyl isobutyl ketone/xylene solvent system. The viscosity is 85 to 165 cps at 77° F. (25° C.) and is slightly thixotropic. The specific gravity is 0.92 to 0.97. Typically, metal surfaces are cleaned of all oil, grease, rust, scale, dirt and other contaminants by mechanical or chemical methods. Grit blasting of most metals is an established method of surface preparation which gives excellent results.

CHEMLOK 220 and 205 may be applied by brushing, dipping, roller coatings, or spraying with air, airless, or electrostatic equipment. For best results, a thin, uniform coating is applied by methods which avoid excessive runs, tears, and fatty edges. The applied adhesive should be allowed to dry until visual examination of the film has shown that all solvent has evaporated. This usually takes 10 to 30 minutes at room temperature.

Other CHEMLOK bonding agents are commercially available such as the CHEMLOK 217 and 217E and are considered one-coat nitrile and neoprene elastomer-to-metal bonding agents. CHEMLOK 217 has a viscosity of 75 to 150 cps at 77° F. (25° C.) and uses the solvent NEK and xylene. CHEMLOK 217E has a viscosity of 425 cps and uses the solvents per chloroethylene, monochlorobenzene, and acetone. Application procedures are similar to the other CHEMLOK bonding agents. CHEMLOK 607 is a commercially available agent for silicone rubber and other specialty elastomers and may also be used.

The elastomers which may be bonded were listed in the aforementioned column. One commonly used form of synthetic rubber which is used in the aircraft industry is known as VAMAC, which is a commercially available synthetic rubber made by the DuPont Chemical Company. Basically, the word "elastomeric" or "elastomer" is used to refer to rubber and synthetic rubber and similar materials which can be polymerized to a solid, yet resilient texture. Vulcanization is a type of polymerization process which involves the use of heat and pressure to transform a tacky, plastic mixture into an elastic, firm product. Transfer molding techniques are generally well known and involve the molding of thermosetting materials in which the plastic is softened by heat and pressure in a transfer chamber and then forced at high pressure through suitable sprues, runners, and gates into a closed mold cavity for final curing.

Figure 2:
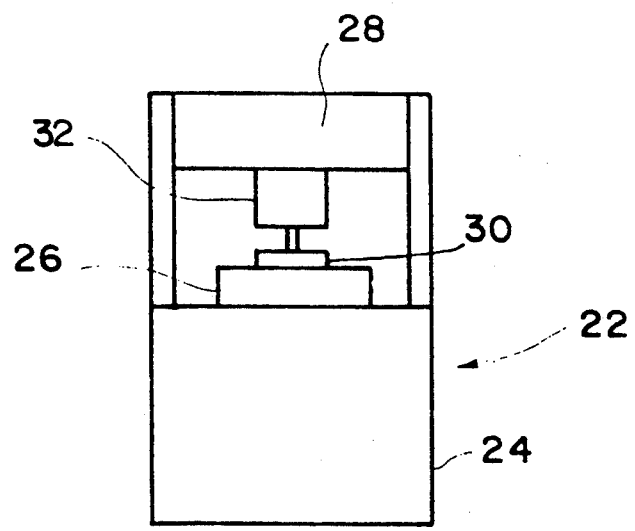
FIG. 2 is a schematic view of a transfer press apparatus used to effect the process of the present invention.

The process of the present invention involves a molding process, such as a transfer molding process. A transfer molding press is schematically illustrated in FIG. 2 and is referred to by the numeral 22. The press 22 has a base 24 on which a heatable lower plate 26 is mounted. A heatable transfer pot 28 is disposed above the bottom plate 26 and a mold 30 is mounted on an upper surface of the lower plate 26 at the appropriate time (to be described in detail below). The transfer pot 28 includes a ram 32 which is used to inject under high pressure a quantity of uncured elastomeric material. The press 22 schematically illustrated in FIG. 2 is known as a transfer press and is commercially available through Pasadena Hydraulics.

The process of the present invention requires that a mold 30 be fabricated in a desired shape so that the injectable material fills a void defined by surfaces of the metal parts 10 and 12 and internal surfaces of the mold. After an appropriate mold has been fabricated, compatible adhesives and elastomeric material are selected. For example, a VAMAC synthetic rubber material may be used in conjunction with one of the CHEMLOK or other commercial heat curable adhesives.

Selection of the elastomeric material and adhesive depends on the intended use and the type of product being fabricated. VAMAC and THIXON OSN2 by Dayton Chemical Company as the adhesive are particularly suitable for lead-lag dampers used on certain helicopters at the rotor. These lead-lag dampers are partially illustrated in FIGS. 1 and 3, and this particular sample requires that two metal parts 10 and 12 be interconnected through an elastomeric block 14.

The process of bonding the two metal parts 10 and 12 to the elastomeric block 14 begins when the elastomeric material is pre-vulcanized so as to be flowable into the mold. Prior to placing the metal parts in the mold, the metal surfaces are thoroughly degreased in freon or suitable solvent. The bonding surfaces of the metal parts are abraided and cleaned by grit-blasting. After grit-blasting, the metal parts are once again thoroughly degreased with freon or a suitable solvent.

Afterwards, the bonding surfaces of the metal parts are coated with the adhesive and the adhesive is allowed to air dry. The metal parts are then assembled in the mold 30 and, without having the mold placed on the press 22, the bottom plate 26 is preheated as well as the upper transfer pot 28 to obtain a cure temperature. After preheating, the transfer pot 28 is loaded with a predetermined quantity of uncured elastomeric material. Then, the mold 30 is clamped to the lower plate 26 while the quantity of uncured elastomer is pressed under high pressure into the mold. The uncured elastomeric material is rammed in at, for example, 4,000 psi until the mold is completely filled. Once filled, the pressure is reduced to 2,000 psi and is held for 45 minutes at 330° F.

The most important aspect of the present process is that the adhesive and elastomeric material temperature come up at the same time so that the adhesive is not pre-cured by virtue of the bottom plate 26 heating the mold 30 to such a degree that pre-curing of the adhesive occurs before injection of the elastomeric material. Thus, heat and pressure are applied to the mold until the elastomer and the adhesive are vulcanized and cured simultaneously.

Figure 3:
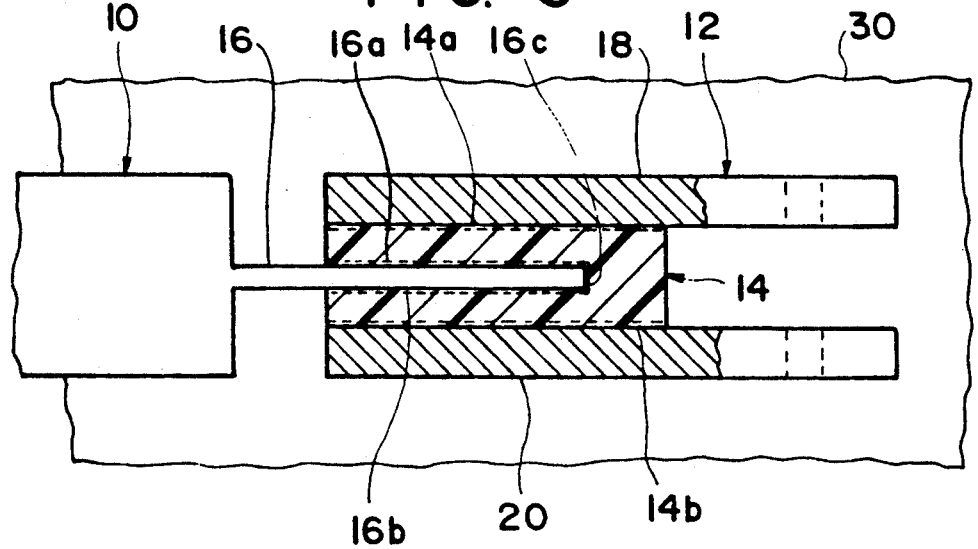
FIG. 3 is an enlarged plan view, partly in section, of the device having metal parts and elastomeric material bonded therebetween made according to the present process.

This process leads to a stronger interface adhesion between the metal, adhesive and elastomer because of the simultaneous curing/vulcanization which occurs at substantially equal temperature, pressure and time. This removes the stresses on all the materials involved, i.e., the metal parts, adhesive, and elastomer, which would come from separate vulcanization and bonding cure processes. The co-curing of elastomer and adhesive agent is believed to lead to areas 14a, 14b, 16a, 16b and 16c of cross-linking between the adhesive and the elastomer. It is also believed that the use of a mold to not only support and position the metal parts but also to form, locate, and cure the elastomer simultaneously is novel. In particular, as seen in FIG. 3 the mold 30, shown with the top removed, fills all of the voids between the two metal parts 10 and 12 so that the elastomeric block 14 is defined by not only the surfaces of the metal parts but also the mold.

Numerous modifications and adaptations of the present invention will be apparent to those so skilled in the art and thus, it is intended by the following claims to cover all such modifications and adaptations which fall within the true spirit and scope of the invention.

What is claimed is:

1. A process for bonding elastomeric material to a metal part comprising:
   coating a heat curable adhesive on surfaces of the metal part to be bonded;
   placing the metal part in a mold;
   preheating a bottom plate and an upper transfer pot of a transfer molding machine to a predetermined cure temperature;
   loading a predetermined quantity of uncured elastomeric material into the transfer pot;
   clamping the mold containing the adhesive coated metal part to the bottom plate, and almost contemporaneously;
   pressing the uncured elastomeric material into the mold while maintaining heat and pressure in the mold for a time sufficient to vulcanize and thereby cure the elastomeric material simultaneously with the adhesive, whereby contacting surfaces of the metal part are strongly bonded to the vulcanized elastomeric material.

2. A process of bonding elastomeric material to a metal part as claimed in claim 1, further comprising degreasing the metal part and abraiding the contact surfaces of the metal part prior to coating with the heat curable adhesive.

3. A process of bonding elastomeric material to a metal part as claimed in claim 1, wherein a shape of the elastomeric material is defined by the contact surfaces of the metal part and inner surfaces of the mold.

4. A process of bonding elastomeric material to a metal part as claimed in claim 1, wherein the pressing occurs at 4,000 psi initially until the mold is filled, and the process further comprises reducing the pressure to 2,000 psi and maintaining the pressure at 2,000 psi for about 45 minutes at about 330° F.

5. A process of bonding elastomeric material to another part as claimed in claim 1, wherein the elastomeric material is a synthetic rubber and the adhesive is a heat curable adhesive dissolved in an evaporable solvent.

6. A process of bonding elastomeric material to a metal part as claimed in claim 5, wherein the metal part is placed in the mold after the coated adhesive has dried.

* * * * *